Dec. 31, 1968     K. A. BRANDENBERG     3,419,032
DIFFERENTIATOR VALVE FOR FLUID LOGIC CIRCUITS
Filed July 8, 1966

INVENTOR.
KARL A. BRANDENBERG
BY Barr, Freeman & Molinare
ATTORNEYS.

United States Patent Office 3,419,032
Patented Dec. 31, 1968

3,419,032
DIFFERENTIATOR VALVE FOR FLUID
LOGIC CIRCUITS
Karl A. Brandenberg, Hayward, Calif., assignor to Aro
Corporation, a corporation of Ohio
Filed July 8, 1966, Ser. No. 563,747
6 Claims. (Cl. 137—102)

This invention relates to pneumatic logic systems and, more particularly, to a novel pneumatic differentiator.

In my copending U.S. application Ser. No. 479,758, filed Aug. 16, 1965, a pneumatically operated control system is disclosed wherein logic functions are performed by modular "building blocks." These pressure operated logic elements are interconnected by fluid passageways defined by the base plates upon which the building blocks are mounted, eliminating the maze of tubing which would otherwise be required.

The modular, pneumatic control system disclosed in the above-mentioned application operates primarily in two-valued or "binary" logic, the two values being indicated by the presence or absence of pressure. The pneumatic logic blocks may accordingly be identified (according to their function) by the same terms which have been applied to logic blocks in electronic digital systems, such as "AND," "OR," "NOT" and so on. A novel valve module capable of performing an "OR" function is disclosed in my copending U.S. application Ser. No. 513,215, filed Dec. 13, 1965. The "AND" function is performed by the module described in my copending U.S. application Ser. No. 523,507, filed Jan. 25, 1966.

It is a general object of the present invention to provide a pneumatic differentiator.

It is a further object of the present invention to translate a prolonged pressure pulse into a pressure pulse of shorter duration.

It is a further object of the present invention to produce an output pressure pulse of predetermined, relatively short duration upon the application of a prolonged input pressure pulse.

It is a further object of the present invention to provide a pneumatic differentiator adapted for sealed mounting on a fluid circuit board.

In a principal aspect, the present invention takes the form of a pneumatic logic block capable of translating a prolonged input pressure pulse into a short duration output pressure pulse, the leading edges of the two pulses occurring at substantially the same point in time. The logic module according to the invention includes an inlet port and an outlet port, each of which is adapted to communicate with passageways in a fluid logic circuit. According to a first feature of the invention, when the input pressure pulse is initially applied to the inlet port, fluid flows through the inlet to the outlet through a normally open valve. According to a second feature of the invention, fluid also is allowed to flow at a measured rate from the inlet through a constricted passage into an accumulation chamber. Means responsive to the magnitude of pressure in the accumulation chamber are employed for closing the normally open valve to terminate the fluid flow from the inlet to the outlet and to vent the outlet port to terminate the output pressure pulse.

These and other objects, features and advantages of the present invention may be more clearly understood through a consideration of the following detailed description. In the course of this description, reference will frequently be made to the attached drawings in which.

Figure 1:
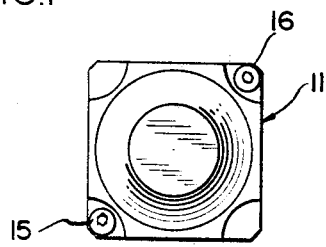
FIGURE 1 is a top view of a differentiator module embodying the invention.
Figure 3:
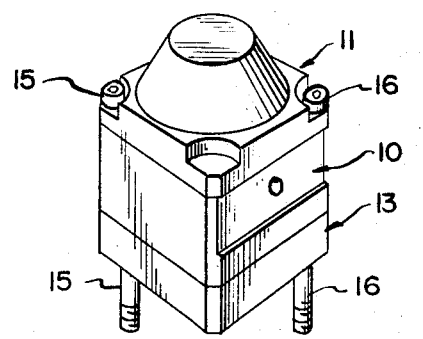
FIGURE 3 is a perspective view of the module shown in FIGURES 1 through 3.
Figure 2:
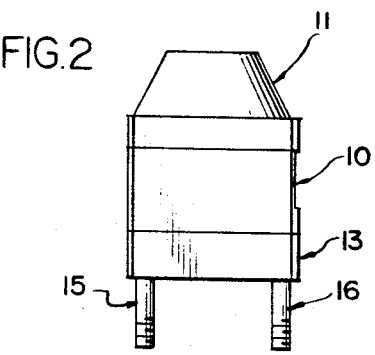
FIGURE 2 is a side elevational view of the differentiator.

The exterior details of the differentiator module are illustrated in FIGURES 1 through 3 of the drawing. The module includes a three-part housing comprising an intermediate section indicated generally at 10 sandwiched between an upper dome 11 and a base 13. A pair of mounting studs 15 and 16 project downwardly from diagonally opposite corners of the base section 13.

Figure 5:
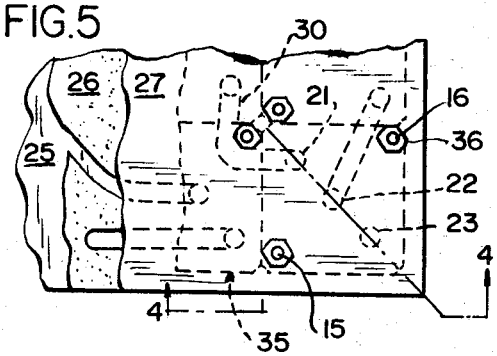
FIGURE 5 is a bottom plan view looking upward at the underside of the pneumatic circuit board and illustrating the positioning of the mounting studs and ports on the underside of the differentiator module.

As shown in FIGURE 5, the base section 13 includes three ports 21, 22 and 23 which are aligned along a diagonal of the bottom face of base section 13. The base section 13 is mounted against a fluid circuit board comprising a cover plate indicated at 25 in FIGURES 4 and 5, a gasket wafer indicated at 26 and a base plate indicated at 27. Portions of the gasket wafer 26 are cut away to form passages between the cover plate 25 and the base plate 27. The passageways indicated at 30 and 31 are in a communication with the ports 21 and 22 respectively.

Figure 4:
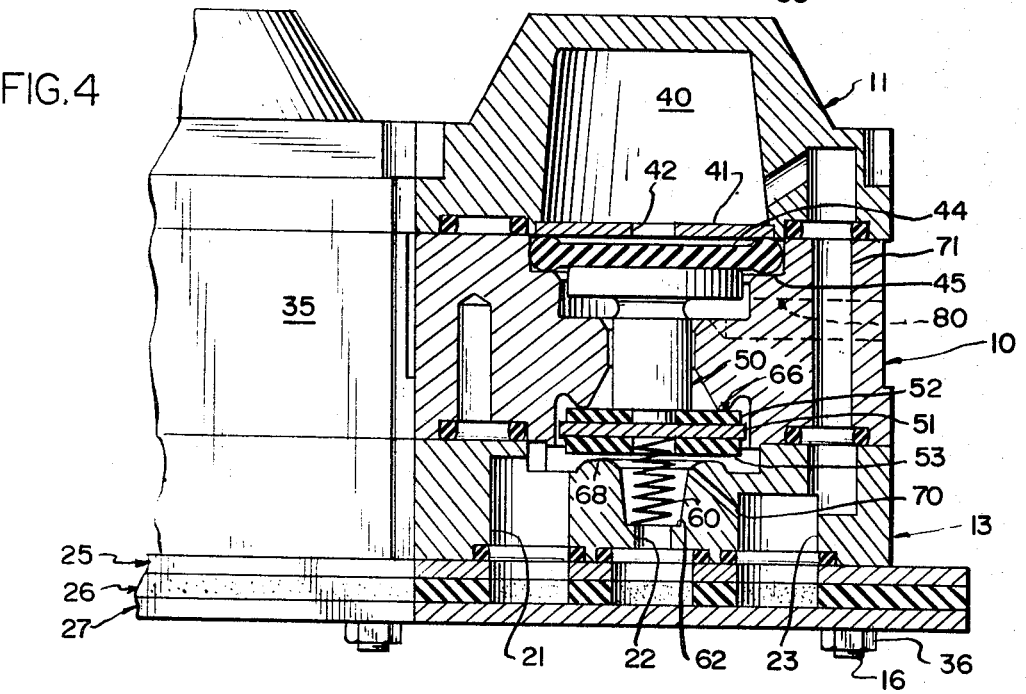
FIGURE 4 is a cross-sectional view showing the inner details of the differentiator according to the present invention.

As shown in FIGURES 4 and 5, the differentiator module may be positioned adjacent other pneumatic logical elements, such as the one shown at 35, and communication between the various modules mounted upon the fluid circuit board is accomplished through the passageways defined by the cutaway portions of gasket wafer 26. The studs 15 and 16 extend downwardly through the housing as shown in FIGURE 3 and provide means for clamping the three-part housing together and to the fluid circuit board. As shown in FIGURE 4, the stud 16 is held in position by a nut 36.

The interior of the differentiator module is shown in cross section in FIGURE 4 and includes an accumulator chamber 40 defined within the upper dome section 11. A plate 41 having a central opening 42 is sandwiched between the dome section 11 and the intermediate section 10 of the housing. Pressure within the accumulator chamber 40 is applied through the opening 42 to the upper surface of a flexible diaphragm 44 which is retained within an annular recess 45 in the intermediate section 10. The lower surface of diaphragm 44 bears against the flattened head 48 of a valve stem indicated generally at 50. At its lower end, plunger 50 carries a metal plate 51 flanked on its upper side by a resilient outlet valve disk 52 and on its lower side by a second resilient valve disk 53. Disks 52 and 53 may be constructed of rubber, neoprene, or the like. Valve stem 50 is urged upwardly by a compression spring 60 which seats against a shoulder 62 immediately above the port 22. When valve stem 50 is urged to its uppermost position by the spring 60, the disk 52 bears against the annular exhaust seat 66 defined by a shaped internal portion of the intermediate section 10. In this uppermost position, a flow path is created between the lower disk 53 and an annular seat 68 defined by the base section 13.

When pressure is applied to the port 22 (the inlet port for the differentiator module), a measured fluid flow passes through the constricted orifice 70 to the blocked port 23 from which it is allowed to flow upwardly through passageway 71 to the accumulator chamber 40. The slowly increasing pressure in accumulator chamber 40 bears against the top of diaphragm 44 and, when the pressure becomes sufficient to overcome the combined upward forces supplied by the pressure at port 22 (which forces the disk 52 against exhaust seat 66), and by spring 60, the plunger 50 is urged downwardly such that disk 53 engages with seat 68, closing the passage between inlet port 22 and outlet port 21. At the same time, the resilient disk 52 disengages from the exhaust seat 66, allowing the pressure existing at outlet port 21 to vent through an exhaust passageway indicated at 80 through the sidewall of the intermediate section 10. Since the area of seat 68 is less than the area of seat 66, the pressure at port 22 creates less upward force against plunger 50 than was formerly the case.

When pressure at the inlet 22 is removed at the termination of the input pulse, the accumulator chamber 40 is vented through the orifice 70 to allow the valve stem 50 to return to its original position, automatically resetting the differentiator module.

As will be appreciated from the foregoing discussion, the embodiment of the invention shown in FIGURE 4 produces an output pressure pulse at port 21 upon the application of an input pressure pulse to inlet port 22. Regardless of the duration of the input pulse delivered to the port 22 (provided that it is of longer duration than the desired output pulse duration), the pressure pulse at outlet port 21 terminates after a time interval whose duration is determined by the combination of several factors; namely, the measured flow rate through orifice 70, the total volume of accumulator chamber 40 and its associated passages, the spring pressure produced by a spring 60, the area of the exhaust seat 66, and the surface area of diaphragm 44. Termination of the input pulse has no effect upon the pressure level at the output port 21. Longer output pulse durations may be created without altering the module shown in FIGURE 4 by communicating the port 23 with an additional accumulator chamber which may take the form of a separate module mounted on the fluid circuit board.

It is to be understood that the embodiment of the invention which has been described is merely illustrative of one application of the principles of the invention. Numerous modifications may be devised by those skilled in the art without departing from the true spirit and scope of the invention.

What is claimed is:
1. A pneumatic device for translating an input pressure pulse of a first duration into an output pressure pulse of shorter duration comprising, in combination:
   a housing provided with an inlet port, an outlet port, and an exhaust port,
   means for applying said input pulse to said input port,
   a three-way valve within said housing for providing a passage between said inlet port and said outlet port when said valve is in a first position and for providing a passage between said outlet port and said exhaust port when said valve is in a second position,
   an enlarged chamber within said housing,
   a constricted passageway connecting said chamber and said inlet port for providing a measured fluid flow into said chamber whenever said input pressure pulse is applied to said inlet port,
   spring means for holding said valve normally in said first position, and means responsive to the magnitude of pressure in said chamber for transferring said valve from said first position to said second position to terminate fluid flow from said inlet port to said outlet port and to vent said output port through said exhaust port to terminate the output pressure pulse.

2. An arrangement as set forth in claim 1 wherein said input port and said output port are adapted to communicate with passageways in a fluid logic circuit.

3. An arrangement as set forth in claim 1 wherein said means for transferring said valve from said first position to said second position comprises, in combination, a diaphragm having one face thereof in communication with the pressure within said accumulator chamber, and means responsive to deformation of said diaphragm caused by an increase in the pressure within said chamber for actuating said valve.

4. An arrangement as set forth in claim 1 including an additional port in said housing, said additional port being in communication with said accumulator chamber to permit the effective volume of said chamber to be increased by coupling an additional chamber to said additional port.

5. An arrangement as set forth in claim 1 wherein said valve bears against a first valve seat when in said first position such that the pressure difference between said inlet port and said exhaust port tends to hold said valve against said first seat.

6. An arrangement as set forth in claim 5 wherein said valve bears against a second seat when in said second position, said second seat having a smaller effective area than said first seat.

References Cited

UNITED STATES PATENTS 3,343,558   9/1967   De Vita _____ 137—102

WILLLIAM F. O'DEA, *Primary Examiner.*

HOWARD M. COHN, *Assistant Examiner.*

U.S. Cl. X.R.

251—20